US008214443B2

(12) United States Patent
Hamburg

(10) Patent No.: US 8,214,443 B2
(45) Date of Patent: Jul. 3, 2012

(54) ELECTRONIC MAIL FORWARDING SERVICE

(75) Inventor: Keith Martin Hamburg, Reston, VA (US)

(73) Assignee: AOL Inc., Dulles, VA (US)

( * ) Notice: Subject to any disclaimer, the term of this patent is extended or adjusted under 35 U.S.C. 154(b) by 135 days.

(21) Appl. No.: 12/398,044

(22) Filed: Mar. 4, 2009

(65) Prior Publication Data

US 2009/0228564 A1 Sep. 10, 2009

Related U.S. Application Data

(60) Provisional application No. 61/034,079, filed on Mar. 5, 2008.

(51) Int. Cl.
*G06F 15/16* (2006.01)

(52) U.S. Cl. .......................................... 709/206; 726/26

(58) Field of Classification Search .................. 709/206; 726/26

See application file for complete search history.

(56) References Cited

U.S. PATENT DOCUMENTS

| | | | | |
|---|---|---|---|---|
| 6,360,254 | B1 | 3/2002 | Linden et al. | |
| 6,532,489 | B1 * | 3/2003 | Merchant | 709/206 |
| 6,594,644 | B1 | 7/2003 | Van Dusen | |
| 7,016,938 | B1 | 3/2006 | Quine | |
| 7,475,256 | B2 | 1/2009 | Cook | |
| 2003/0154254 | A1 * | 8/2003 | Awasthi | 709/206 |
| 2003/0208547 | A1 * | 11/2003 | Branimir | 709/206 |
| 2006/0149677 | A1 * | 7/2006 | Shahine et al. | 705/50 |
| 2007/0180039 | A1 * | 8/2007 | Sutidze et al. | 709/206 |
| 2008/0028446 | A1 * | 1/2008 | Burgoyne | 726/6 |
| 2008/0281924 | A1 * | 11/2008 | Gadwale | 709/206 |

* cited by examiner

*Primary Examiner* — Duyen Doan
(74) *Attorney, Agent, or Firm* — Finnegan, Henderson, Farabow, Garrett & Dunner, LLP

(57) ABSTRACT

A system and method are disclosed that enable an email service provider to implement an email forwarding service without losing associated page views. In one embodiment, rather than forwarding the entire email message, the email forwarding service generates a summary email message, and sends this summary email message to the forwarding email address pre-specified by the subscriber. This summary email message includes a link that is selectable by the user to view the original email message on a web site of the email service provider. Thus, even if the forwarding email address is hosted externally, the subscriber still views the full email message on a web site of the provider of the email forwarding service.

27 Claims, 6 Drawing Sheets

Hi, Keithhamburg 1 ▼ Sign Out
AOL.com | AIM

AOL ⊙ Mail  Settings | Help ▼

Search [        ] [Mail ▼] [Web]

[Back to Mail]
[Save Settings]

General
Accounts
Compose
Spam Controls

Mail Forwarding

Mail Forwarding

Forwarding Address

[                            ]   [Submit & Confirm]

Status: *Address Unconfirmed*   [Resend Confirmation] ←—— *113*

110 ——→ ● Disable Forwarding
112 ——→ ○ Forward a copy of all incoming email to:

Local copy

● Keep a copy in my Inbox
○ Delete local copy after forwarding

Security

● Require login to read all forwarded messages ←—— *114*
○ Allow me to read forwarded messages one time without login ←—— *116*

Send Feedback   AOL Mail Blog
2007 AOL LLC, All Rights Reserved

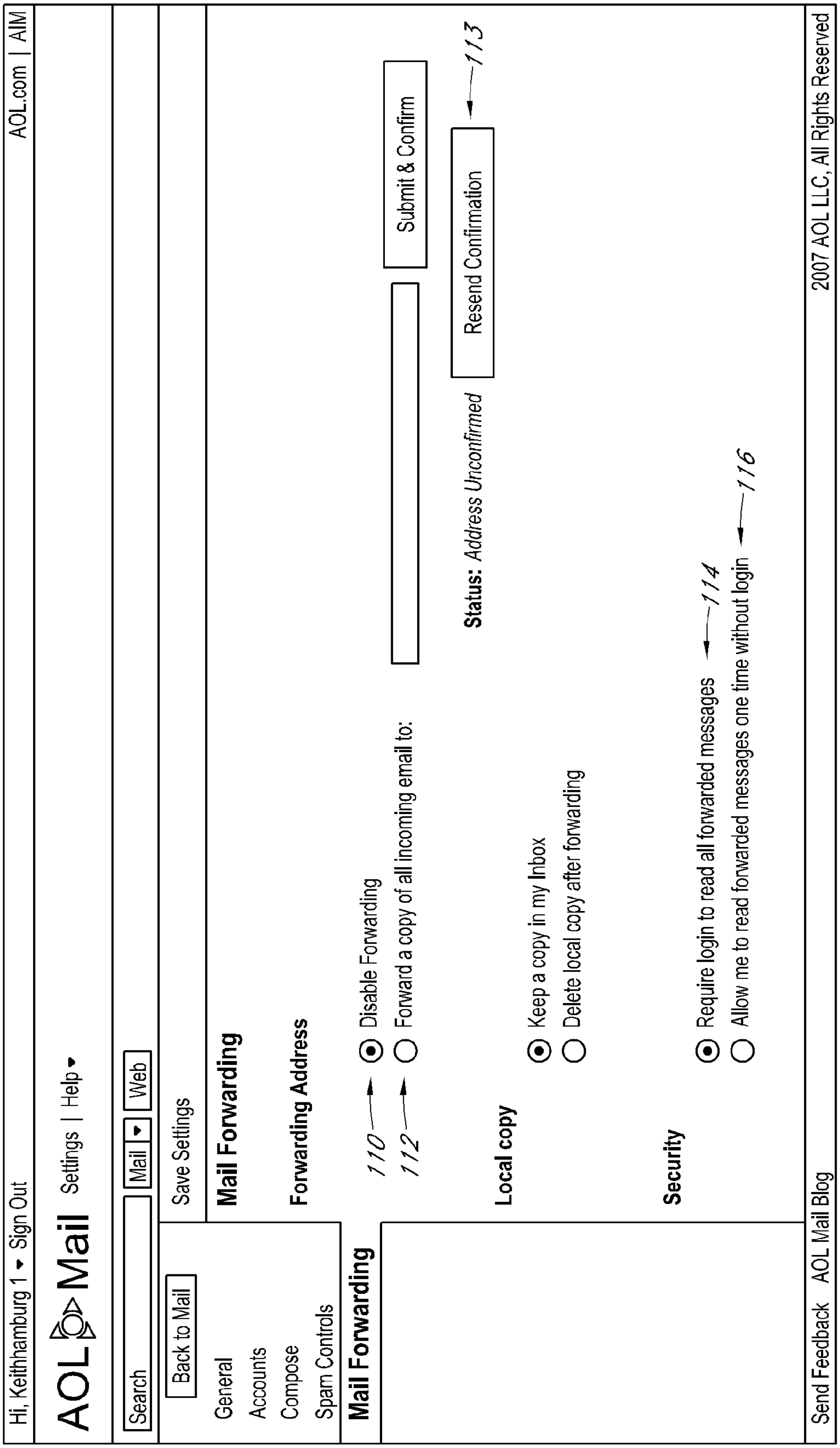

*FIG. 2*

ELECTRONIC MAIL FORWARDING SERVICE

RELATED APPLICATIONS

This application claims the benefit of U.S. provisional application No. 61/034,079, filed Mar. 5, 2008, the disclosure of which is hereby incorporated by reference.

BACKGROUND OF THE INVENTION

1. Technical Field

This disclosure relates to the field of electronic mail. More specifically, this disclosure relates to computer-implemented methods and systems for forwarding electronic mail messages.

2. Description of the Related Art

Some electronic mail service providers ("email providers") offer email message forwarding services to their subscribers. Using such a service, a subscriber can request that email messages sent to a first email address of the subscriber automatically be forwarded to a second email address of the subscriber. The second email address may correspond to an email account with a different email service provider.

Many email providers, and particularly those that provide a web-based interface for subscribers to access their accounts, derive revenue from advertising. These email providers tend to lose page views, and thus advertising revenue, by implementing an email forwarding service. Further by forwarding email messages, these email providers frequently drive traffic to the web sites of their competitors. These issues are especially problematic for free consumer email providers that monetize their email services by serving advertisements or other forms of sponsored content.

The present disclosure seeks to address at least some of these problems.

SUMMARY OF THE DISCLOSURE

A system and method are disclosed that enable an email service provider to implement an email forwarding service without losing associated page views. In one embodiment, rather than forwarding the entire email message, the email forwarding service generates a summary email message, and sends this summary email message to the forwarding email address pre-specified by the subscriber. This summary email message includes a link that is selectable by the user to view the original email message on a web site of the email service provider. Thus, even if the forwarding email address is hosted externally, the subscriber still views the full email message on a web site of the provider of the email forwarding service.

In some embodiments, the system may implement one or more features for inhibiting unauthorized access to the "forwarded" email messages. For example, the system may generate a unique URL for accessing the original email, where the unique URL is of sufficient length and variability to inhibit identification by trial and error of valid URLs (those that validly point to a forwarded email message). Further, when the user selects the link or otherwise generates a request for the unique URL, the system may, in some or all scenarios, prompt the user to log in. The system may also restrict access based on how many times the URL has successfully or unsuccessfully been used to access an email.

One aspect of the invention is thus a computer-implemented method of providing email message forwarding functionality. The method comprises receiving and storing a first email message addressed to a first email address of a user. In response to receiving the first email message, a second email message is generated and sent to a second email address pre-specified by the user. The second email message contains a textual summary of the first email message, and lacks at least a portion of the message content of the first email message. The second email message also includes a link that is selectable by the user to access a web page that displays the first email message. The link may be encoded with information for inhibiting unauthorized access to the first email message.

Neither this summary nor the following detailed description purports to define the invention. The invention is defined by the claims.

BRIEF DESCRIPTION OF THE DRAWINGS

These and other features will now be described with reference to the drawings summarized below. These drawings and the associated description are provided to illustrate a preferred embodiment of the invention, and not to limit the scope of the invention.

FIG. 2 illustrates an example web site form page for allowing users to configure the email forwarding service, in accordance with one embodiment of the invention.

DETAILED DESCRIPTION OF THE PREFERRED EMBODIMENT

Numerous technical details are set forth in this description. These details are provided to illustrate a preferred embodiment of the invention, and are not intended to limit the invention. Thus, nothing in this detailed description is intended to imply that any particular feature, characteristic, or component of the disclosed system is essential to the invention. The invention is defined by the claims.

I. Overview

The preferred embodiment of the present invention provides a system the implements an email forwarding service. Rather than forwarding an entire email message, the email forwarding service generates, and sends to the subscriber's forwarding email address, a forwarding email message (also referred to as a summary email message) containing a hyperlink for viewing the original email on a web site hosted by the system. This hyperlink points to a unique URL that is specific to the original or "forwarded" email message. As explained below, the URL (and thus the hyperlink) may be encoded with information that inhibits access to forwarded email messages via trial-and-error.

An important benefit of the service is that it enables email providers that support email message forwarding to increase their page views, and thus their advertising revenue. This is because the subscribers who use email forwarding still view the original emails on a web site of the provider of the email forwarding service. The service also allows users to create multiple email addresses that have meaning to them, and to engage with those addresses without having to change their existing behavior related to email. For example, upon receiving the forwarding email message, the recipient can immediately click on the link to access the original email message received at an original email address. Thus, the user will be more likely to adopt and engage in long-term use of an original email address hosted by an email provider. This is particularly useful when the original email address is not the primary email address of a user.

The system may implement one or more methods for inhibiting unauthorized access to the forwarded email messages. For example, when a user/browser requests a unique URL associated with a forwarded email message, the system may require the user to log-in. The system may also limit the number of times a particular URL can be used (or can be used without user authentication) to access a corresponding email.

II. General Architecture and Operation

Figure 1:
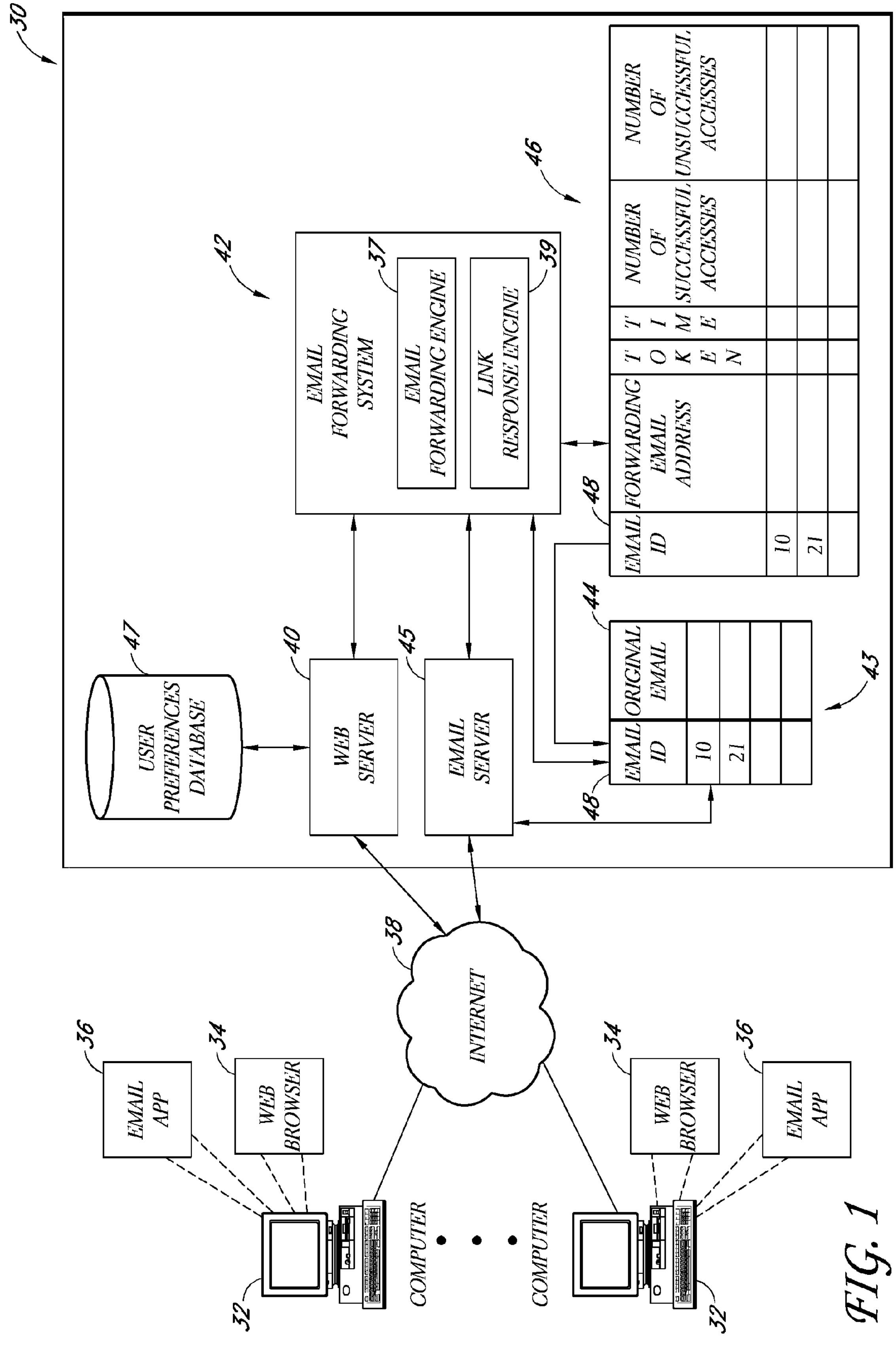
FIG. 1 illustrates an email system that implements an email forwarding service, and illustrates typical user components for accessing the system, in accordance with one embodiment of the invention.

FIG. 1 illustrates an email system 30 that implements an email forwarding service, and illustrates typical user components for accessing the system, in accordance with one embodiment of the invention. The email system may be operated by an email provider that derives revenue by serving advertisements on a web site used by subscribers to access their email accounts. As depicted in this drawing, one or more subscribers use a general purpose computer or computing device 32 with access to the internet 38 to access the system 30. Alternatively, the subscriber may access the system 30 using a handheld device such as a smartphone. The subscriber's computer 32 may run a commercially available email application 36, such as Mozilla Thunderbird and/or Microsoft Outlook, which supports the use of links. The subscriber computers 32 also may run web browser applications 34, such as Mozilla Firefox, Apple Safari, and/or Microsoft Internet Explorer, which implement the basic World Wide Web standards such as HTTP and HTML. The email application 36 and the web browser 34 may be integrated with one another, and/or may be integrated with other application programs or the operating system of the subscriber's computer 32. In some embodiments, the subscribers may access their email accounts solely via a web site, in which case the email applications 36 may be omitted.

In the preferred embodiment, the system 30 comprises a server system (typically comprising multiple physical computers/machines) and associated content that are accessible via the internet 38. The system 30 may be implemented using physical computer servers that are geographically remote from one another and/or may include content that spans multiple internet domains. As shown in the illustrated embodiment, the system 30 may be accessible by computers 32 via the internet 38. In the illustrated embodiment, the system 30 hosts a web site that provides functionality for users to compose, send, and receive email messages.

As further depicted in FIG. 1, the system 30 includes a web server 40 that providers user access to a web-based email application. The web server may be implemented as one or more physical servers/machines that execute web server software. The web server 40 accesses a HTML database (not shown) and various back-end components that are used to generate web pages in response to the actions of end users. Additionally, the web server 40 accesses a user preferences database 47 which stores user preference data. The web server 40 also accesses an email forwarding system 42. The web server provides web-based subscriber access to email accounts, as is conventional in the art.

The email forwarding system 42 accesses a forwarded email database 46 that includes information about email messages that have been forwarded by the system 30. (The term "forward" is used herein to encompass the scenario in which only a summary or incomplete version of the original email message is sent to the forwarding email address.) In the embodiment shown, each entry in the forwarded email database 46 includes the following fields: an email identifier 48, a forwarding email address, a token, a timestamp (shown as time), the number of successful accesses to the original email message, and the number of unsuccessful accesses to the original email message. The information shown in the forwarded email database 46 is just one of many examples of data that may be stored for providing secure access to forwarded email messages. Alternatively, the system may only store an email identifier 48 or some other subset or set of fields in the forwarded email database 46.

As further depicted in FIG. 1, the email forwarding system 42 also accesses an original email database 43. In the embodiment shown, each entry in the original email database 43 includes an email identifier 48 and the original email message. Both the forwarded email database 46 and the original email database 43 use the email identifier 48 to associate an entry in each database with a corresponding entry in the other database. Alternatively, the email forwarding database 46 and the original email database 43 may be implemented as a single database, or may be implemented using a different type of data repository (e.g., flat files). Both the forwarded email database 46 and the original email database 43 can be stored in persistent computer storage, such as disk drive storage.

The email forwarding system 42 includes an email forwarding engine 37 and a link response engine 39. The email forwarding engine 37 handles the email forwarding process. Each time an original email message is received at the original email address of a user that has email forwarding enabled, the email forwarding engine 37 creates an entry in the forwarded email database 46 and associates it with an entry in the original email database 48.

The email forwarding engine 37 also generates a forwarding email document comprising a human-readable summary of, and unique link to, the original email message, and sends this document to a forwarding email address pre-specified by the user-addressee. In the preferred embodiment, the forwarding email document includes a textual summary that lacks at least a portion of the message content of the original email message. In other embodiments, the forwarding email document may lack a summary of the original email message and/or could include multiple links for allowing the user to perform different types of actions. For example, the forwarding email document could have one link to view the original email message, and another link to delete the original email message.

The link response engine 39 responds browser requests for URLs that fall within a range of URLs that can potentially correspond to forwarded emails. These URL requests are also referred to as link requests, since they are typically generated by user selection of a link in a summary email. Each time such a URL or link request is received by the web server 40, the link response engine 39 validates the request and updates the forwarded email database 46 accordingly. The link response engine 39 and the email forwarding engine 37 may be integrated with one another, and/or may be integrated with other programs.

As further depicted in FIG. 1, the system 30 also includes an email server 45 connected to the internet 38. Alternatively, the email server 45 may be connected to a private network and/or an intranet. The email server 45 may be implemented using one or more physical computer email servers, which may be geographically remote from one another in some embodiments. The email server 45 accesses the original email database 43 and the email forwarding system 42.

FIG. 2 illustrates an example web form page for allowing users to configure the email forwarding service in accordance with one embodiment of the invention. This form page may be accessible to subscribers via the web server 40 as part of a web site hosted by the system 30. The radio buttons, 110 and 112, allow the user to enable and disable email message forwarding. The form also includes a field for entering a forwarding email address. If the user enables email message forwarding, a confirmation email is sent to the forwarding email address. In one embodiment, the confirmation email message includes a link that, when selected by the user, results in the system responding by enabling email message forwarding for this user. A "resend confirmation" button 113 enables the user to have the system resend the confirmation email message.

As further depicted in FIG. 2, the web site form page also allows the user to change or set up rules for email forwarding. For example, the user can select an option 114 for requiring user login to access the original email message, or can select an option 116 for enabling the original email message to be accessed one time without log-in. If option 116 is selected in this example, the user will be prompted to log-in if the user attempts to re-access an original email via its unique URL. Numerous additional and alternative configuration options may be provided. For example, an option may be provided which enables each unique URL to be used without log-in to access the corresponding email an unlimited number of times. Further, various user options may be provided for specifying the content or format of the summary emails.

Figure 3:
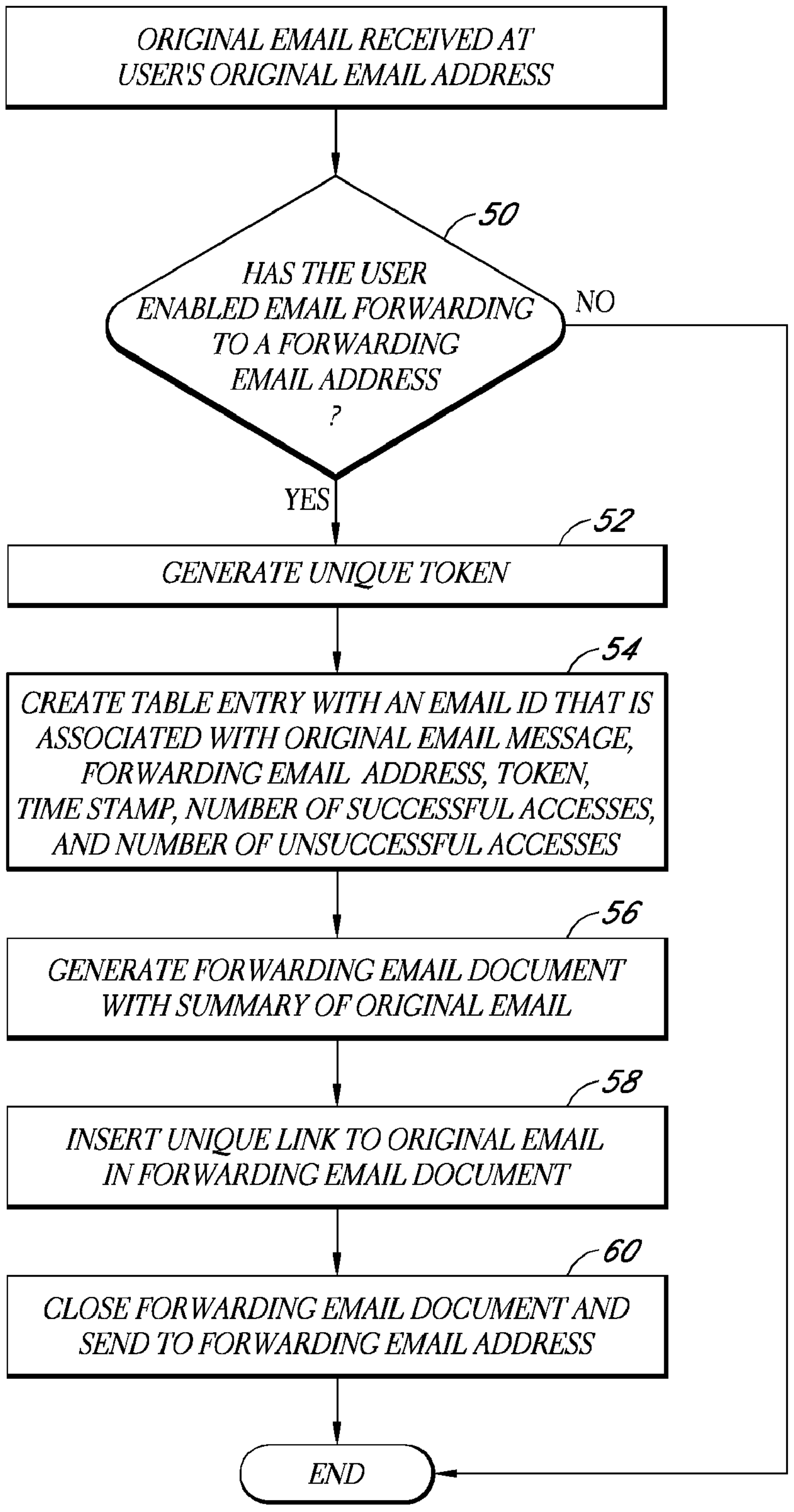
FIG. 3 illustrates a sequence of steps that may be performed by the email forwarding engine of FIG. 1, in accordance with one embodiment of the invention.

FIG. 3 illustrates a sequence of steps that may be performed by the email forwarding engine 37 of FIG. 1 according to one embodiment of the invention. This process is executed when an email message addressed to a user's original email address is received by the email server 45. In step 50, each time an email message is received at the user's original email address, the email forwarding engine 37 determines whether the user has enabled email forwarding to a forwarding email address. If email forwarding is not enabled for this original email address, the process ends.

If email forwarding is enabled, a unique token is generated in step 52. The token generation process is invoked each a time a new link is created, and uses a generation algorithm that randomly selects or generates an alphanumeric token to include in the unique URL. The length of the token is preferably sufficient (e.g., 8 alphanumeric characters) to inhibit trial-and-error identification of valid tokens. In step 54, a new entry in the forwarded email database 46 is created with an email identifier 48 that is associated with the original email message, a forwarding email address, the token, a timestamp, the number of successful accesses (initialized to zero), and the number of unsuccessful accesses (also initialized to zero). As will be recognized, numerous variations are possible. For example, the fields for tracking numbers of successful and unsuccessful access attempts may be omitted. In addition, the email ID and timestamp could be encoded in the token in encrypted form; in such embodiments, the email forwarding database 46 may be omitted, and may be effectively replaced with a token decoding and validation program.

The email identifier 48 is the identifier associated with the original email message that is forwarded, and is preferably unique. The forwarded email database 46 and the original email database 43 use the email identifier 48 to associate an entry in each database with a corresponding entry in the other database. The forwarding email address is the address which the user has selected to receive the forwarded email message. The timestamp represents the current date and/or time, and may be a Unix time stamp which represents the number of seconds elapsed since 1970. Inclusion of the timestamp provides additional security and a mechanism for later determining whether the token has expired. In the preferred embodiment, the timestamp represents the time that the original email message was received or the forwarded email message was sent. Alternatively, the timestamp may be in the form of an expiration date and/or time.

The number of successful accesses is the number of successful requests to access the original email message via its unique URL. The number of unsuccessful accesses is the number of unsuccessful attempts to use the unique URL to access the original email message. A request may be unsuccessful if, for example, the user is prompted to log in and provides invalid log-in information. The link response engine may update these values over time in response to access attempts.

In step 56, the email forwarding engine 37 also generates a forwarding email document with a summary of the original email message. The summary of the email message comprises at least some portion of the original electronic mail message, and preferably includes less than all of its message content. In the preferred embodiment, the forwarding email document is sent from the original email address (the address to which the original email message was sent) to the forwarding email address, and includes the same subject that appears in the original email message.

In step 58, a unique link to the original email is inserted into the forwarding email document. In the preferred embodiment, this link (and specifically the target URL portion of the link) includes the token, the email identifier 48 of the original email message, the timestamp, and the forwarding email address. Some or all of these parameters may be provided in the URL in encrypted form. As will be recognized some of these parameters can alternatively be omitted. For example, the URL could contain the token only, which could be used by the system 30 a key to looking up and retrieve the corresponding original email message. Finally, in step 60, the email forwarding engine 37 closes the forwarding email document and sends it to the forwarding email address.

Figure 4:
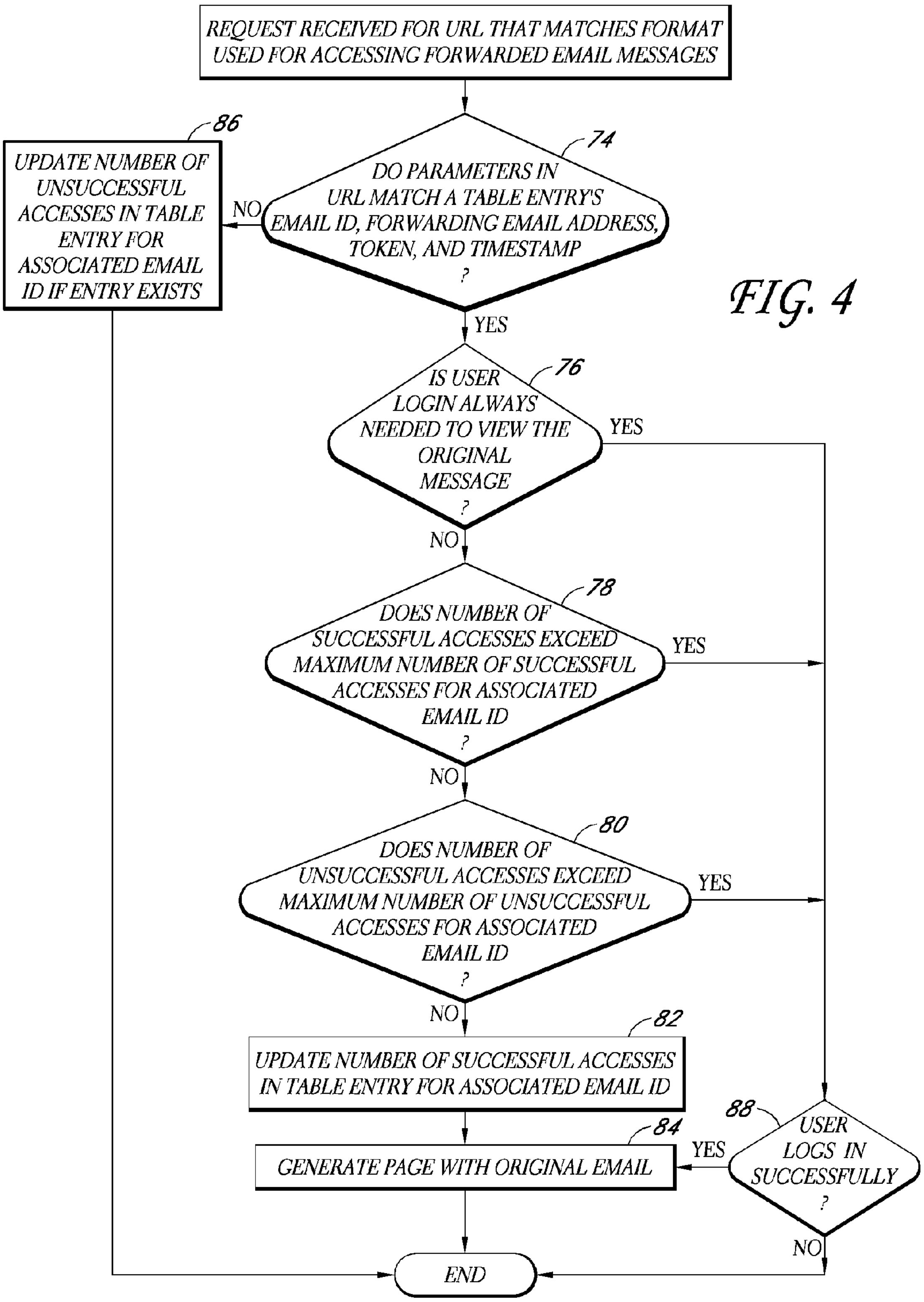
FIG. 4 illustrates a sequence of steps that may be performed by the link response engine of FIG. 1, in accordance with one embodiment of the invention.

FIG. 4 illustrates a sequence of steps that may be performed by the link response engine 39 of FIG. 1 in accordance with one embodiment of the invention. This process is executed when the web server 40 receives request for a URL that matches the URL format used for accessing forwarded email messages (e.g., www.mail.com/forwarded-mail/<encoded alphanumeric string of fixed length>). In step 74, the link response engine 39 determines whether the parameter or parameters encoded in the URL correspond to an entry in the forwarded email database 46. The actual checking that is performed will depend on the type or types of parameters included in the unique URL. In some embodiments, the link response engine may grant access to the original email based solely on the information encoded in the unique URL, without checking for a valid database entry.

If a matching entry in the forwarded email database 46 is not found, the link response engine 46 updates the number of unsuccessful accesses in the entry associated with the email identifier 48, provided that such an entry exists, and the process ends (step 86). In the preferred embodiment, the number of unsuccessful accesses is initially set to zero and updated by the link response engine 39 by incrementing the count by one. By updating the number of unsuccessful accesses, the link may be rate limited, such that the unique URL can later be invalidated after a number of unsuccessful attempts to view the original email message without authentication.

If a matching entry in the forwarded email database 46 is found, the link response engine 39 determines whether user authentication is needed to view the original email message (steps 76, 78, and 80). Preferably, the authentication method is a user login procedure in which the user must supply a valid username/password combination. In other embodiments, a security token or signature may be used for user authentication.

In step 76, the link response engine 39 checks whether a system defined or user defined rule is set such that user login is always needed to view the original email message. If user login is not always needed to view the original email message, the process continues. Otherwise in steps 88 and 84, if user login is always needed and the user logs in successfully, the link response engine 39 generates a web page with the original email message (and typically one or more advertisements), and the process ends. In the preferred embodiment, the web page with the original email message is generated by using the email identifier 48 of the matching entry in the forwarded email database 46 as a search key to retrieve the original email message in the original email database 43. If user login is always needed and the user does not log in successfully, the process ends.

In step 78, the link response engine 39 determines whether the number of successful accesses in the matching entry found in the forwarded email database 46 exceeds the maximum number of successful accesses. The maximum number of successful accesses may be set using a system defined or user defined rule. If the number of successful accesses does not exceed the maximum number of successful accesses, the process continues. Otherwise in steps 88 and 84, if the number of successful accesses exceeds the maximum number of successful accesses and the user logs in successfully, the link response engine 39 generates a web page with the original email message and the process ends. In the preferred embodiment, the web page with the original email message is generated by using the email identifier 48 of the matching entry in the forwarded email database 46 as a search key to retrieve the original email message in the original email database 43. If the number of successful accesses exceeds the maximum number of successful accesses and the user does not log in successfully, the process ends.

In step 80, the link response engine 39 also determines whether the number of unsuccessful accesses in the matching entry found in the forwarded email database 46 exceeds the maximum number of unsuccessful accesses. The maximum number of unsuccessful accesses may be set using a system defined or user defined rule. If the number of unsuccessful accesses does not exceed the maximum number of unsuccessful accesses, the process continues. In steps 88 and 84, if the number of unsuccessful accesses exceeds the maximum number of unsuccessful accesses and the user logs in successfully, the link response engine 39 generates a web page with the original email message as described above, and the process ends. If the number of unsuccessful accesses exceeds the maximum number of unsuccessful accesses and the user does not log in successfully, the process ends.

In step 82, the link response engine 39 updates the number of successful accesses in the matching entry found in the forwarded email database 46. In step 84, the link response engine 39 generates a web page with the original email message.

In some embodiments, the link response engine may also increment the “unsuccessful access attempts” count for a given email ID if/when the user fails to successfully log in at step 88.

Figure 5:
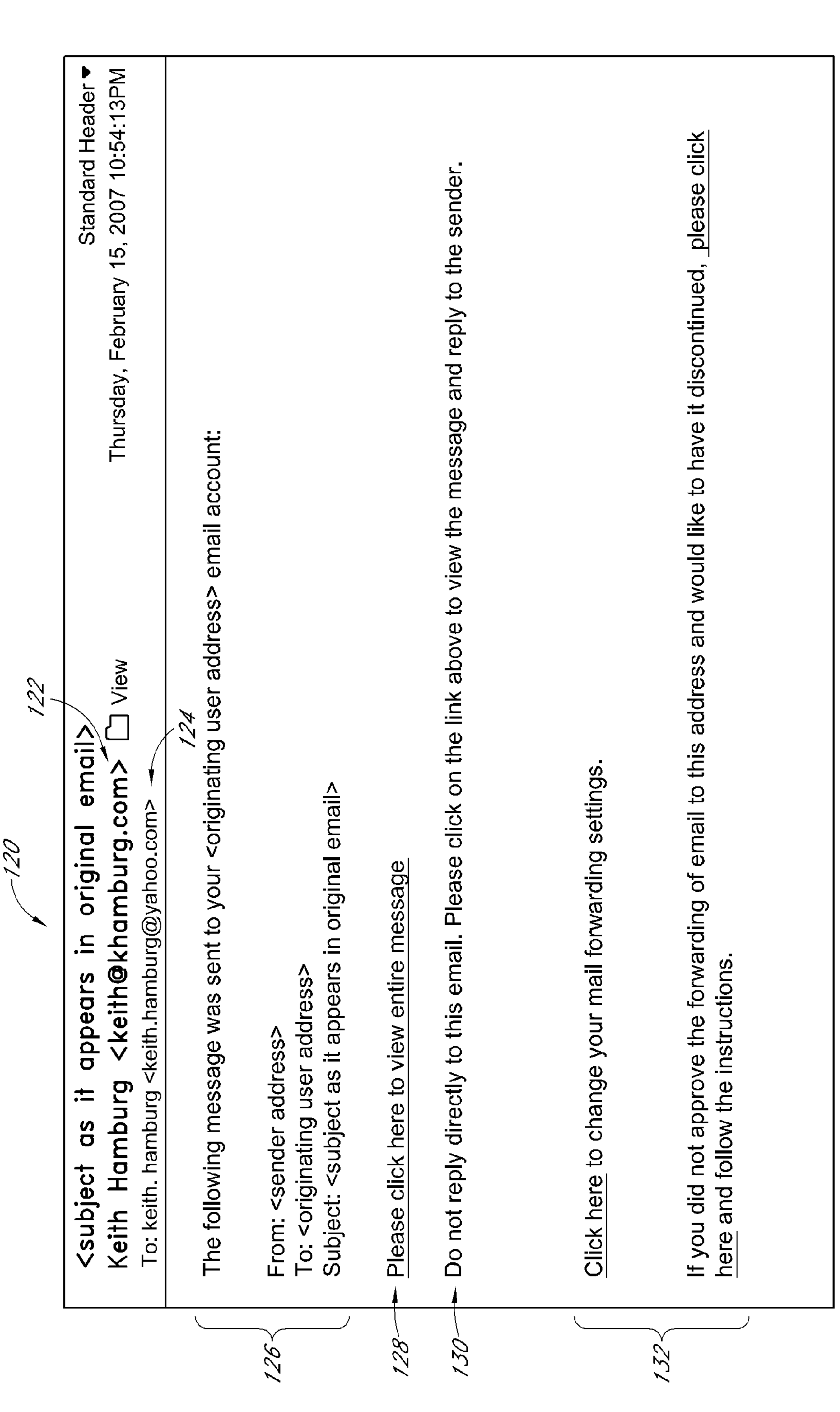
FIG. 5 illustrates an example email message generated by the email forwarding service, in accordance with one embodiment of the invention.

FIG. 5 illustrates an example email message generated by the email forwarding service, in accordance with one embodiment of the invention. The forwarding email document includes the same subject field 120 that appears in the original email message, a “sent from” field 122 set to the email address to which the original email message was sent, and a “to” field 124 set to the forwarding email address. In the preferred embodiment, the user cannot reply to the sender of the original email message by replying to the forwarded email message 130. Alternatively, where the user’s forwarding email address is hosted by the same email provider or is on the same domain name as the original email address, the user may be allowed to reply to the original email message sender by replying to the forwarding/summary email message.

The forwarding email document includes a summary 126 of the original email message. In this example, the summary identifies the sender of the original email message, the original email address to which the email message was sent, and the subject. The summary 126 may also include other information, such as the first N words or sentences of the original email. The forwarding email document also includes a link 128 to a web page for viewing the original email message. The link 128 is generated and validated as described above. In one embodiment, the email identifier 48, forwarding email address, token, and timestamp are encoded in the link as described above, and act as an access code for securely accessing the original email message. Although the link 128 is displayed as a hypertext link (underlined text) in this example, it may alternatively be displayed as a button, graphic, or other user-selectable display object.

As further depicted in FIG. 5, the forwarding email document may also include a link 132 to a web page (FIG. 2) for changing the email forwarding settings associated with the original email address. The forwarding email message may also include a link (not shown) that can be selected to immediately delete the original email message from the system 30. As with the link 128 for viewing the original email message, these links may include encoded information that enables the user to securely access these functions.

Figure 6:
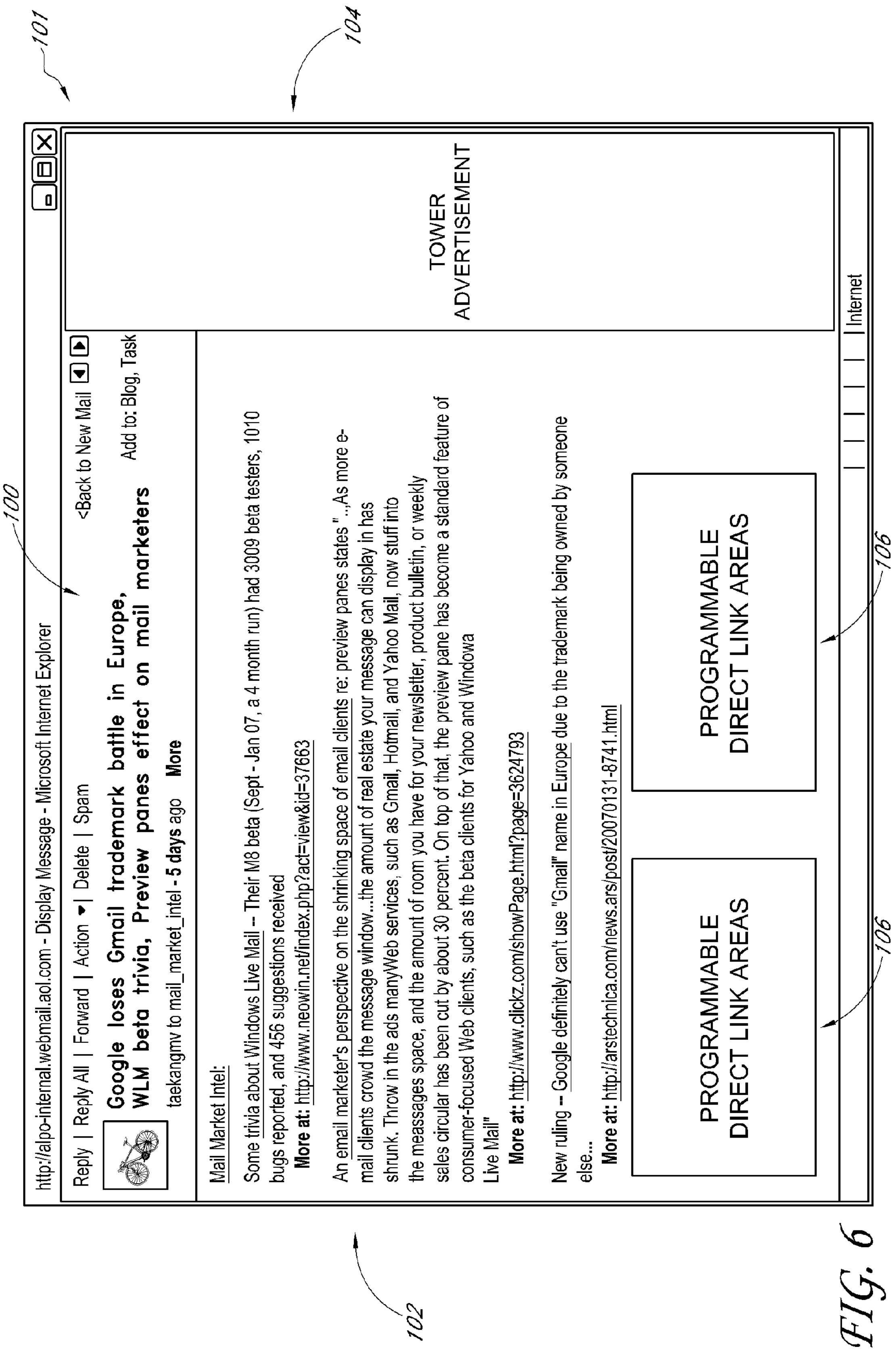
FIG. 6 illustrates an example web page that is displayed when the subscriber selects the link in FIG. 5 for viewing the entire email message.

FIG. 6 illustrates an example of an original email web page 101 that is displayed when the subscriber selects the link 128 in FIG. 5 for viewing the entire email message. The original email web page 101 includes a content area 102 which displays the original email message. The original email web page 101 also includes a tower advertisement 104, and programmable direct link areas 106 that link to other web pages affiliated with the email provider’s web site. Scroll bars allow for longer original email messages to be viewed in the original email content area 102. The email provider may charge advertisers on a pay-per-view, pay-per-click, or other basis for displaying their advertisements.

The original email web page 101 also includes a functional header 100. In the preferred embodiment, the functional header 100 is the same as the read-only view of a standard web email client. In this embodiment, when the user selects a function in the functional header 100, authentication (e.g., login information) is needed before accessing the full functionality of the email product. Once the user logs in, the user may, for example, choose to delete the original email message, in which case the system may delete the corresponding entries in the email databases 43, 46.

III. Conclusion

All of the methods and processes described above may be embodied in, and fully automated via, software code modules executed by one or more general purpose computers or processors. The code modules may be stored in any type of computer-readable storage medium (solid state RAM, magnetic disks, optical disks, etc.) or other computer storage device. Some or all of the methods may alternatively be embodied in specialized computer hardware. Thus, the disclosed methods and processes may be implemented in their entirety by a computerized machine that comprises one or more physical computing devices.

Although this invention has been described in terms of certain embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the following claims.

What is claimed is:

1. A computer-implemented method of providing email message forwarding functionality, the method comprising:

providing a web-based email service for a plurality of subscribers, the web-based email service including a website for enabling subscribers to access email messages, the website generating revenue by displaying advertisements when a subscriber accesses email messages;

receiving and storing a first email message addressed to a first email address of a subscriber of the web-based email service, the first email message including a body section containing message content;

in response to receiving the first email message, automatically generating and sending, to a second email address pre-specified by the subscriber, a second email message that contains a textual summary of the first email message, the second email message lacking at least a portion of the message content of the first email message, wherein the second email message includes a link that is selectable by the subscriber to access the first email message from the website of the web-based email service, the link encoded with information that identifies the first email message; and in response to the subscriber selecting the link in the second email message, serving, by the web-based email service, a web page containing the first email message, the web page further including at least one advertisement to generate advertising revenue for the website of the web-based email service even though the subscriber accessed the first email message through the link in the second email message.

2. The method of claim 1, wherein the link comprises encrypted information that identifies the first email message.

3. The method of claim 1, wherein the web page that contains the first email message and the at least one advertisement is served without requiring the subscriber to log in to an email account.

4. The method of claim 1, further comprising, in response to receiving the indication of the selection of the link, determining whether a threshold number of unsuccessful attempts to access the first email message have occurred.

5. The method of claim 1, wherein the second email message includes an additional link that is selectable by the subscriber to immediately cause the first email message to be deleted.

6. An email system programmed to perform the method of claim 1.

7. A non-transitory computer-readable medium having stored thereon a computer program that embodies the method of claim 1.

8. A computer-implemented method of providing email message forwarding functionality, the method comprising:

providing a web-based email service for a plurality of subscribers, the web-based email service including a website for enabling subscribers to access email messages, the website generating revenue by displaying advertisements when a subscriber accesses email messages;

receiving and storing an original email message addressed to an original email address of a subscriber of the web-based email service, the original email message including a body section containing message content;

generating a forwarding email document comprising a summary of the original email message and a unique link for accessing the original email message from the website of the web-based email service, the summary lacking at least a portion of the message content of the original email message;

sending the forwarding email document to a forwarding email address of the subscriber; and in response to the subscriber selecting the link in the forwarding email document, serving a web page containing the original email message, the web page further including at least one advertisement to generate advertising revenue for the website of the web-based email service even though the subscriber accessed the original email message through the link in the forwarding email document.

9. The method of claim 8, wherein the unique link comprises a URL that includes an identifier of the original email message.

10. The method of claim 9, wherein the identifier is included in the URL in encrypted form.

11. The method of claim 8, the web page including the original email message and the at least one advertisement is served without requiring the subscriber to log in to an email account.

12. The method of claim 8, further comprising, in response to user selection of the link, determining whether a threshold number of unsuccessful attempts to access the first email address have occurred.

13. The method of claim 8, wherein the forwarding email message includes an additional link that is selectable by the user to immediately cause the original email message to be deleted.

14. A non-transitory computer-readable medium having stored thereon a computer program which embodies the method of claim 8.

15. An email system programmed to perform the method of claim 8.

16. A system for providing email message forwarding functionality, the system comprising:

a web server that provides access to a web-based email application, the web-based email application allowing a plurality of subscribers to access email messages and to enable an email forwarding service, wherein the web server generates revenue by hosting a web site that displays advertisements when a subscriber accesses email messages; and an email forwarding system that implements the email forwarding service, the email forwarding system being configured to:

responsive to receipt of a first email message addressed to a first email address of a subscriber of the web-based email application, generate a second email message; and send the second email message to a second email address pre-specified by the subscriber, the second email message including a summary of the first email message, and further including a link that is selectable by the subscriber to access the first email message via the website of the web server, wherein, in response to the subscriber selecting the link in the second email message, the web server provides instructions for displaying a web page containing the first email message, the web page further including at least one advertisement to generate advertising revenue even though the subscriber accessed the first email message through the link in the second email message.

17. The system of claim 16, wherein the email forwarding system is configured to omits from the second email message at least some message content of the first email.

18. The system of claim 16, wherein the link includes encoded information that identifies the first email message.

19. The method of claim 1, wherein the second email address is supported by an email service that is distinct from the web-based email service.

20. The method of claim 7, wherein the forwarding email address is supported by an email service that is distinct from the web-based email service.

21. The system of claim 16, wherein the second email address is supported by an email server that is distinct from the web server.

22. A computer-implemented method of providing electronic message forwarding functionality, the method comprising:

providing a web-based message service for a plurality of registered users, the web-based message service including a website for enabling registered users to electronically access messages, the website generating revenue by displaying advertisements when a registered user electronically accesses messages;

receiving and storing a first message addressed to a registered user of the web-based message service, the first message including a body section containing message content;

in response to receiving the first message, automatically generating and sending, to an email address pre-specified by the registered user, a second message that contains a textual summary of the first email, the second message lacking at least a portion of the message content of the first message, wherein the second message comprises an email with a body section that includes a link that is selectable by the registered user to electronically access the first message from the website of the web-based message service, the link encoded with information that identifies the first message; and in response to the user selecting the link in the second message, serving a web page containing the first message, the web page further including at least one advertisement to generate advertising revenue for the website of the web-based message service even though the registered user accessed the first message through the link in the second message.

23. The method of claim 22, wherein the link comprises encrypted information that identifies the first message.

24. The method of claim 22, wherein the web page that contains the first message and the at least one advertisement is served without requiring the registered user to log in to the user's email account.

25. The method of claim 22, further comprising, in response to receiving the indication of the selection of the link, determining whether a threshold number of unsuccessful attempts to access the first message have occurred.

26. The method of claim 22, wherein the second message includes an additional link that is selectable by the registered user to immediately cause the first message to be deleted.

27. The method of claim 22, wherein the email address associated with the second message is supported by an email service that is distinct from the web-based message service.

* * * * *

UNITED STATES PATENT AND TRADEMARK OFFICE

CERTIFICATE OF CORRECTION

PATENT NO. : 8,214,443 B2
APPLICATION NO. : 12/398044
DATED : July 3, 2012
INVENTOR(S) : Keith Martin Hamburg It is certified that error appears in the above-identified patent and that said Letters Patent is hereby corrected as shown below:

Claim 17, col. 11, line 25, "to omits" should read -- to omit --.

Signed and Sealed this
Eighteenth Day of December, 2012

David J. Kappos
*Director of the United States Patent and Trademark Office*